United States Patent
Voogd et al.

(10) Patent No.: US 6,615,764 B2
(45) Date of Patent: Sep. 9, 2003

(54) DEVICE FOR AUTOMATICALLY SUPPLYING A PREDETERMINED AMOUNT OF FEED TO AN ANIMAL IN A PERIOD HAVING A PREDETERMINED LENGTH

(75) Inventors: Lucien Eliza Niels Voogd, Hg Leerdam (NL); KArel van den Berg, Br Bleskensgraaf (NL)

(73) Assignee: Lely Enterprises A.G., Zug (CH)

( * ) Notice: Subject to any disclaimer, the term of this patent is extended or adjusted under 35 U.S.C. 154(b) by 0 days.

(21) Appl. No.: 10/260,462

(22) Filed: Oct. 1, 2002

(65) Prior Publication Data

US 2003/0084853 A1 May 8, 2003

(30) Foreign Application Priority Data

Oct. 3, 2001 (NL) .............................................. 1019093

(51) Int. Cl.$^7$ ................................................. A01K 5/02
(52) U.S. Cl. ................................. 119/51.02; 119/51.12; 119/51.13
(58) Field of Search ......................... 119/51.01, 51.02, 119/51.11, 51.12, 51.13, 52.1, 52.4, 53, 14.03, 14.18

(56) References Cited

U.S. PATENT DOCUMENTS

| | | | | | |
|---|---|---|---|---|---|
| 4,461,241 A | * | 7/1984 | Ostler | .................... | 119/51.02 |
| 4,463,353 A | * | 7/1984 | Kuzara | .................... | 340/10.34 |
| 4,532,892 A | * | 8/1985 | Kuzara | .................... | 119/51.02 |
| 4,843,561 A | | 6/1989 | Larson | ........................ | 364/113 |
| 5,012,762 A | * | 5/1991 | Moskvin | ................... | 119/14.18 |
| 5,050,537 A | * | 9/1991 | Fox | ........................... | 119/51.02 |
| 5,205,240 A | * | 4/1993 | Colas et al. | ................. | 119/57.4 |
| 5,355,833 A | * | 10/1994 | Legrain | .................... | 119/51.02 |
| 5,424,957 A | * | 6/1995 | Kerkhoff et al. | ............. | 700/240 |
| 5,457,627 A | * | 10/1995 | Cureton et al. | ............... | 705/34 |
| 5,533,648 A | * | 7/1996 | Read et al. | ................... | 222/108 |
| 5,551,374 A | * | 9/1996 | Wells | ........................... | 119/71 |
| 5,988,106 A | * | 11/1999 | van den Berg | .......... | 119/51.02 |
| 6,443,093 B1 | * | 9/2002 | van der Lely et al. | ..... | 119/14.01 |
| 6,510,815 B1 | * | 1/2003 | Lagardere | .................... | 119/230 |
| 6,516,746 B2 | * | 2/2003 | Pratt | ........................ | 119/51.02 |

FOREIGN PATENT DOCUMENTS

| | | |
|---|---|---|
| DE | 4137387 | 5/1993 |
| EP | 0974264 A1 | 1/2000 |
| FR | 2623688 | 6/1989 |
| NL | 1010898 | 12/1998 |
| WO | WO 00/22919 | 4/2000 |

* cited by examiner

*Primary Examiner*—Yvonne Abbott
(74) *Attorney, Agent, or Firm*—Penrose Lucas Albright (57) ABSTRACT

An apparatus for automatically supplying predetermined amounts of feed to animals over a predetermined period which may be a period of time such as 24 hours or based on other occurrences such as the number of animals that are being fed. Each animal feeds at a trough in a feeding area wherein the animal is identified and which may be provided in a preferably circular feeding column or available to an animal in a milking compartment. A plurality of feed types are provided for each animal wherein the amounts and types are computer controlled and take into consideration a number of factors such as the nutrition needs of the particular animal, its preferences in feed types, whether the animal involved is in a lactation period, the milk yield of the animal, the season of the year, the weather, and the physical profile of the animal being fed. Data is retained in the memory of the computer as to when each animal eats, what it eats, how much if any feed is left in the feeding trough and whether or not an animal has consumed the predetermined types of food that it should consume during the predetermined period. If not, the difference is calculated and an amount of feed is provided in portions for each relevant animal which amount is smaller or equal to the difference as a feed balance to the animal.

34 Claims, 7 Drawing Sheets

DEVICE FOR AUTOMATICALLY SUPPLYING A PREDETERMINED AMOUNT OF FEED TO AN ANIMAL IN A PERIOD HAVING A PREDETERMINED LENGTH

FIELD OF THE INVENTION

The invention relates to a device for automatically supplying a predetermined amount of feed to an animal for a predetermined period of time, the point of time that the feed is supplied being recorded.

BACKGROUND OF THE INVENTION

Such a device is known from the French Demande de Brevet D'Invention Publication No. 2.623.688, of Jun. 2, 1989. In this known device, when supplying feed, the amount of feed previously supplied is taken into account. However, due to the fact that an animal may be jostled by another from the feeding parlor, the animal so jostled does not consume the balance of the feed and receives a supply of feed which is incorrect.

SUMMARY OF THE INVENTION

It is an object of the invention to provide a device for automatically supplying a predetermined amount of feed to an animal in a predetermined period of time so that the supply of feed over said predetermined period, for example one day, is provided accurately and efficiently. By this it is meant, inter alia, that no unnecessary waste of feed occurs and, at the same time, sufficient nutritive substances are supplied to the animal.

According to the invention, for that purpose a device of the above-described type comprises means for measuring the amount of feed actually consumed by each identified animal and when the consumption by an identified animal is insufficient, then making up the difference to ensure that each animal receives the correct amount of feed. -Due to this there is created as it were a time window preceding the momentary visit of an animal and it is determined how much feed in total the animal has actually consumed in that time window, i.e. the predetermined period of time, which period may be for example one day. Consequently, in contrast with the state of the art, when supplying feed, the actually consumed amount and not the amount of feed supplied is taken into account. When the difference between said predetermined amount of feed and the consumed amount is positive, additional feed is supplied to the animal. The maximum amount of feed which is thus supplied to the relevant animal is smaller than or equal to that difference. The invention is further based on the insight that the predetermined amount of feed to be supplied to an animal need not be related only to a predetermined period of time, but that the period can also be determined by the number of animals having made use of the feeding parlor, or by another variable comprising a time aspect.

Accordingly, the invention also relates to a device for automatically supplying a predetermined amount of feed to an animal in a predetermined period, the device being provided with a feeding parlor, with animal identification means for identifying an animal present at the feeding parlor, with a computer for controlling the device for automatically supplying the feed to the feeding parlor, characterized in that the device is provided with means for determining the amount of feed consumed by an animal after receiving a supply of feed, said amount being stored at least temporarily in a memory of the computer, in that the computer is provided with a calculating device for determining the total amount of feed consumed by an animal during the predetermined period immediately preceding the momentary point of time when the animal is identified by the animal identification means at the feeding parlor, in that the calculating device determines the difference between said predetermined amount of feed and said total amount of feed consumed by the animal, and in that the computer controls the device in such a way that during the momentary supply of feed an amount of feed smaller than or equal to the difference can be supplied to provide the feed balance to the animal.

It is possible to supply the feed balance to the animal in one time. However, this has the disadvantage that an animal may not consume the entire feed balance, for example due to the fact that it is jostled from the feeding parlor by another animal. Accordingly, in an embodiment of a device according to the invention, the computer controls the device in such a way that the feed balance is supplied to the animal in portions. When a feed portion is not consumed by the relevant animal, the computer is capable of controlling the relevant components in such a way that no possible further feed portions are supplied.

Depending on the measurement accuracy of the relevant device it is preferred that a feed portion have at least a minimum feed size. As a result thereof measurement errors which would provide portion sizes which are too small and which may result in an inaccurate feeding are at least avoided to a considerable extent.

Although the feed portion size may be provided with a previously adjusted value, it is preferred that the calculating device of the computer calculates the size of the feed portions. As a result thereof the feed portion size can be adjusted for each animal, possibly depending on the prevailing circumstances. It appears to be extremely suitable when the calculated feed portion size is approximately 5% of the feed balance.

In order not to discourage an animal from going to the feeding parlor, in an embodiment of a device according to the invention, the computer is provided with a comparing device for comparing the calculated feed portion size with the minimum feed portion size, while, when the comparison result indicates that the calculated feed portion size is smaller than the minimum feed portion size, the computer controls the device in such a way that the minimum feed portion size is supplied to the animal. Thus there is always supplied a minimum feed portion to the animal.

Depending on grazing or, when the animal is a dairy animal, depending on the last time when the dairy animal has been milked or the time when it is expected to be milked again, or if based on a combination of the foregoing considerations it may be determined that the animal should not be fed. In an embodiment of a device according to the invention, this is provided by including a blocking period in the memory, the computer thus only controlling the device for supplying feed to the animal after, counted from the last point of time that feed was supplied to the animal, the blocking period has elapsed. Said blocking period may have a fixed value or be dynamic., i.e. variable, for example animal-dependent, season-dependent, lactation-period-dependent and the like. It should be noted that the invention is particularly advantageous when no grazing takes place.

In order to be able to check whether the animal actually visits the feeding parlor for eating, when an animal is detected by the animal identification means at the feeding parlor, the computer controls the device in such a way that first one minimum feed portion size is supplied to the animal. When, after the supply of said feed portion the animal leaves the feeding parlor, no further portions are supplied. This has also the advantage that an animal can eat immediately and does not have to wait too long until the relevant feed has been composed.

Also when an animal does not consume feed during its visit to the feeding parlor, it is advantageous that the computer stores the points of time when an animal leaves the feeding parlor in the memory. Said points of time may for example be used for behavioral study, but may also be an indication about the state of health of the animal.

In a further embodiment of a device according to the invention, the means for determining an amount of feed consumed by an animal after a supply of feed comprises measuring means for measuring the weight of the feed in the feeding parlor. The measuring means may comprise a weighing device for weighing the amount of feed in the feeding parlor, although other means, such as picture recognition equipment, may also be applied. It is then also possible that the computer stores data in relation to the remaining feed in a feeding parlor in its memory. The calculating device can take this value for the remaining feed into account when determining the feed balance of a relevant animal. The feed balance is determined, in particular, as being the difference between said predetermined amount of feed and said total amount of feed consumed reduced by the amount of remaining feed.

In order to take remaining feed present in a feeding parlor further into account, in an embodiment of a device according to the invention, the computer is provided with a comparing device for comparing the amount of remaining feed with a minimum threshold value, the computer controlling the device for supplying feed to the feeding parlor only when the comparison indicates that the amount of remaining feed is below the minimum threshold value.

The device is preferably suitable for automatically supplying several types of feed to an animal in a predetermined period. The device may then be provided with a mixing device for mixing the feed types before they are supplied to the feeding parlor. Alternatively the computer controls the device in such a way that at least one kind of feed or preferably all the types of feed are supplied at least substantially separately from the other types of feed to the feeding parlor.

In order immediately to supply feed to an animal reporting for the first time at a feeding parlor of a device provided with several feeding parlors, the computer controls the device in such a way that first feed is supplied to that feeding parlor where an animal has been identified most recently by the animal identification means.

The device according to the invention is preferably provided with at least one milking compartment with a milking robot for automatically milking a dairy animal, the milking compartment being provided with a feeding station with a feed trough. Alternatively or additionally the device is provided with at least one feeding column (placed outside the milking compartment) with a feed trough. When the device comprises both at least one milking compartment and at least one feeding column, the computer in particular controls the collective supply of feed by the feeding station or stations and the feeding column or columns in such a way that the predetermined amount of feed is supplied to an animal during a predetermined period. This is particularly advantageous when grazing does not take place.

In a further embodiment of a device according to the invention, the feeding station or the feeding column, or both, are suitable for automatically supplying at least two kinds of feed, the device being provided with parameter-measuring means for measuring a momentary value of a variable parameter (animal-dependently or animal-independently) and for issuing a parameter value signal to the computer, the computer controlling the feeding station or the feeding column or both by means of a control signal so that types of feed are supplied in a particular amount and in a particular ratio collectively as a mixture, the computer being provided with a processing device for processing the parameter value signal into the control signal. This embodiment of a device according to the invention is based on the insight that the feed intake of the animals appears to depend on certain varying circumstances. Further, for example the amount and the quality of milk produced by a dairy animal appear to depend on certain varying circumstances. According to the invention this is improved by automatically measuring, with the aid of parameter-measuring means, the momentary value of such a circumstance, called the variable parameter, and by processing the corresponding parameter value signal into the control signal. Thus it is possible to take a change in the parameter automatically into account when supplying feed. Moreover, this may make it more attractive for an animal to consume fore feed.

The parameter measuring means are selected, in particular, from the group composed of atmospheric-condition measuring means for measuring the atmospheric conditions, a clock for measuring the point of time of the day, a clock for measuring the period of the year, means for measuring the condition score of an animal, means for determining for each animal the eating rate for each type of feed, means for measuring the milk yield for each animal, means for measuring the amount of protein or fat or minerals or amino acids and the like, including any combination thereof, in the milk obtained from that animal, and means for measuring the amount of each type of feed consumed by an animal.

In an advantageous embodiment of a device according to the invention, the feeding station or the feeding column or both are provided with a receptacle, the conveying means comprising a first conveyor for conveying an amount of feed from the hopper to the receptacle and a second conveyor for conveying the amount of feed from the receptacle to a feed trough. The receptacle is preferably provided with a weighing device for measuring feed present in the receptacle. This makes it possible to determine the amount of feed to be supplied to the feed trough.

Although the feed can be taken out of the receptacle by means of a separate taking-out device, for the sake of simplicity of the construction it is advantageous when a separate taking-out device is not used. A tiltable receptacle may be used, feed falling from said receptacle after the latter has been tilted. However, for improving the hygienic use of the feeding station or the feeding column, or both, it is preferred when the receptacle has a bottom which is designed to be opened. The receptacle is preferably provided with a control device for controlling the opening of the bottom. It has appeared to be particularly suitable when the second conveyor is constituted by a tube-shaped chute or a channel-shaped chute.

In order to prevent an animal waiting at a feeding trough after having been fed, in an embodiment of a device according to the invention, the feed trough is constituted by a feed trough capable of being closed by a closing means, the control device also being suitable for controlling the operation of the closing means.

In a further embodiment of a device according to the invention, the predetermined length of the period is animal-dependent or lactation-period-dependent or season-dependent or weather-dependent, or any combination thereof. As a result an optimal supply of feed is provided for each animal.

BRIEF DESCRIPTION OF THE DRAWINGS

The invention will now be explained in further detail with reference to the embodiments shown in the drawings, in which.

DETAILED DESCRIPTION OF THE PREFERRED EMBODIMENTS

Figure 1:
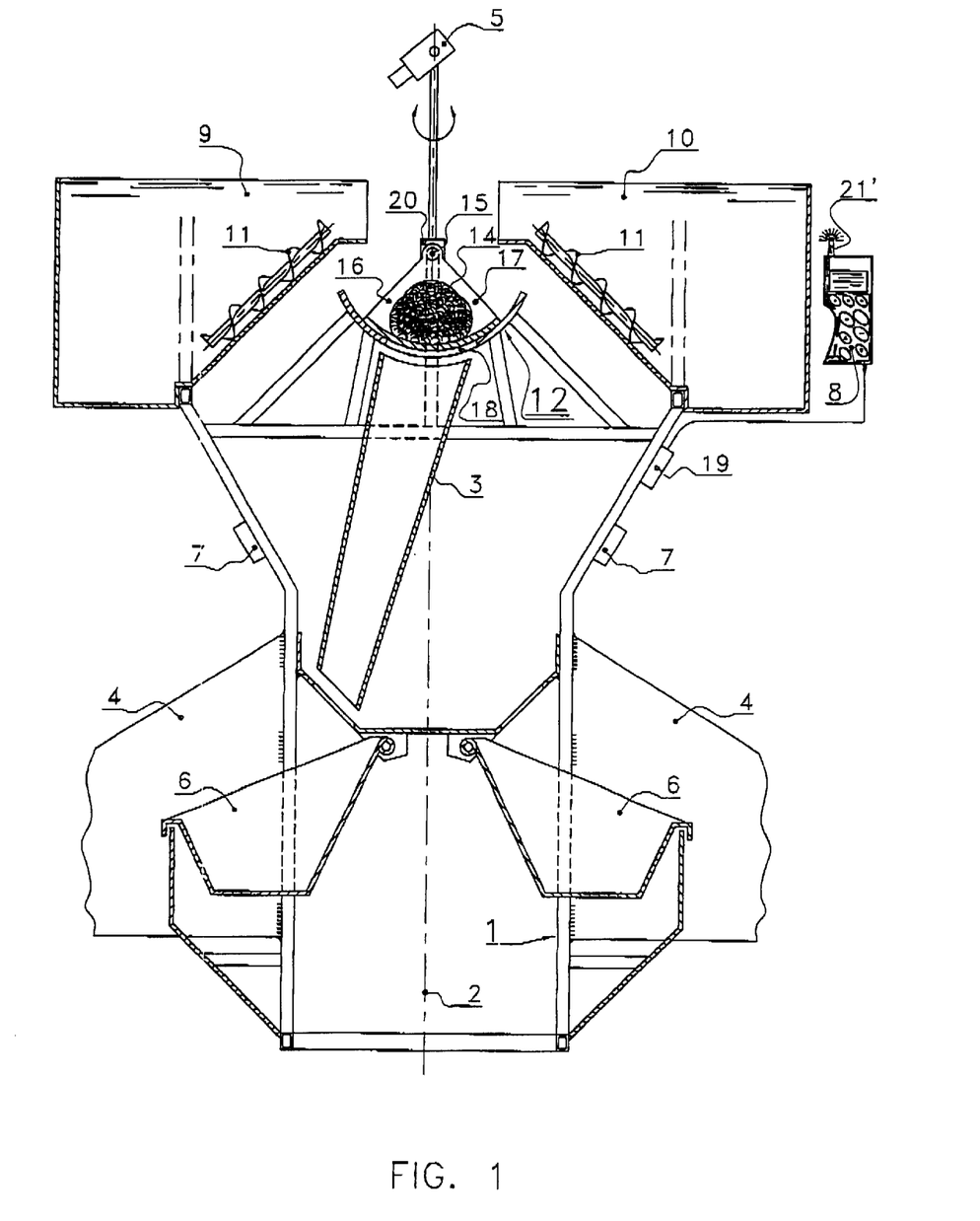
FIG. 1 is a schematic cross-sectional view of a device according to the invention in the form of a feeding column.

FIG. 1 shows an embodiment of a device according to the invention in the form of a feeding column with feed trough. A framework 1, having a substantially circular circumference, is disposed around a central axis 2. A plurality of hoppers 9 and 10 (only two of which are shown in the drawing) are located at the upper side of framework 1. For the installation of hoppers 9 and 10 further provisions, as appropriate, are provided on framework 1. Each of hoppers 9 and 10 contains a particular type of feed.

Framework 1 is provided with partitions 4 which are detachably disposed on framework 1.

Feed troughs 6 for the animals are disposed in a circular arrangement in the lower part of the feeding column. By means of the geometry of the feeding column, the construction occupies little space, while the accessibility of the feeding column to the animals is optimal from all directions.

The feeding column further comprises conveying means comprising first conveyors 11 and a second conveyor 3 for conveying feed from hoppers 9 and 10, respectively, to the relevant feed trough 6. The feed can be conveyed directly from hoppers 9 and 10 to feed troughs 6. In the embodiment shown there is provided a receptacle 12, for example centrally located, that receives an amount of feed conveyed by a first conveyor 11 from either hopper 9 or 10 to receptacle 12. As a first conveyor 11, an auger, gripper, conveyor belt, or any other suitable known construction for conveying feed, can be used.

A second conveyor 3, preferably constituted by a tube-shaped chute or a channel-shaped chute, is suitable for conveying the amount of feed from receptacle 12 to the relevant feed trough 6. For conveying feed to the relevant feed trough 6, it is advantageous when a tube-shaped chute 3 is rotatably mounted in the feeding column. The tube-shaped chute and the channel-shaped chute are preferably fabricated from stainless steel.

The feeding column is provided with a second control device 19. Control device 19 is controlled by a computer 8 (for example interconnected by means of a line) which controls the components of the feeding column so that various types of feed are supplied in a particular order or ratio or both and in a particular amount to feed trough 6, while, of course, the time window to be described hereinafter and the feed balance associated therewith are taken into account.

The feeding column may be provided with feed-determining means 5 for determining the type of feed in hoppers 9 and 10. Such feed-determining means may comprise for example an olfactometer, a color meter or picture recognition equipment (such as described for example in U.S. Pat. No. 4,843,561).

For the purpose of conveying an amount of a type of feed 14 to tube-shaped chute 3, receptacle 12 has a bottom which is designed to be opened. In the embodiment shown it is provided that the bottom of receptacle 12 has two halves 16 and 17 which are pivotable about an axis 15. When the halves 16 and 17 move away from each other, a chute aperture 18 is thus provided through which an amount of feed type 14 falls into tube-shaped chute 3.

Second control device 19, although another (fourth) control device may serve as well for that purpose, controls the opening of the bottom of receptacle 12. Said second control device 19 preferably also controls the order of functioning of first conveyors 11 and second conveyors 3, so that the supply of the types of feed occurs quickly.

Figure 2:
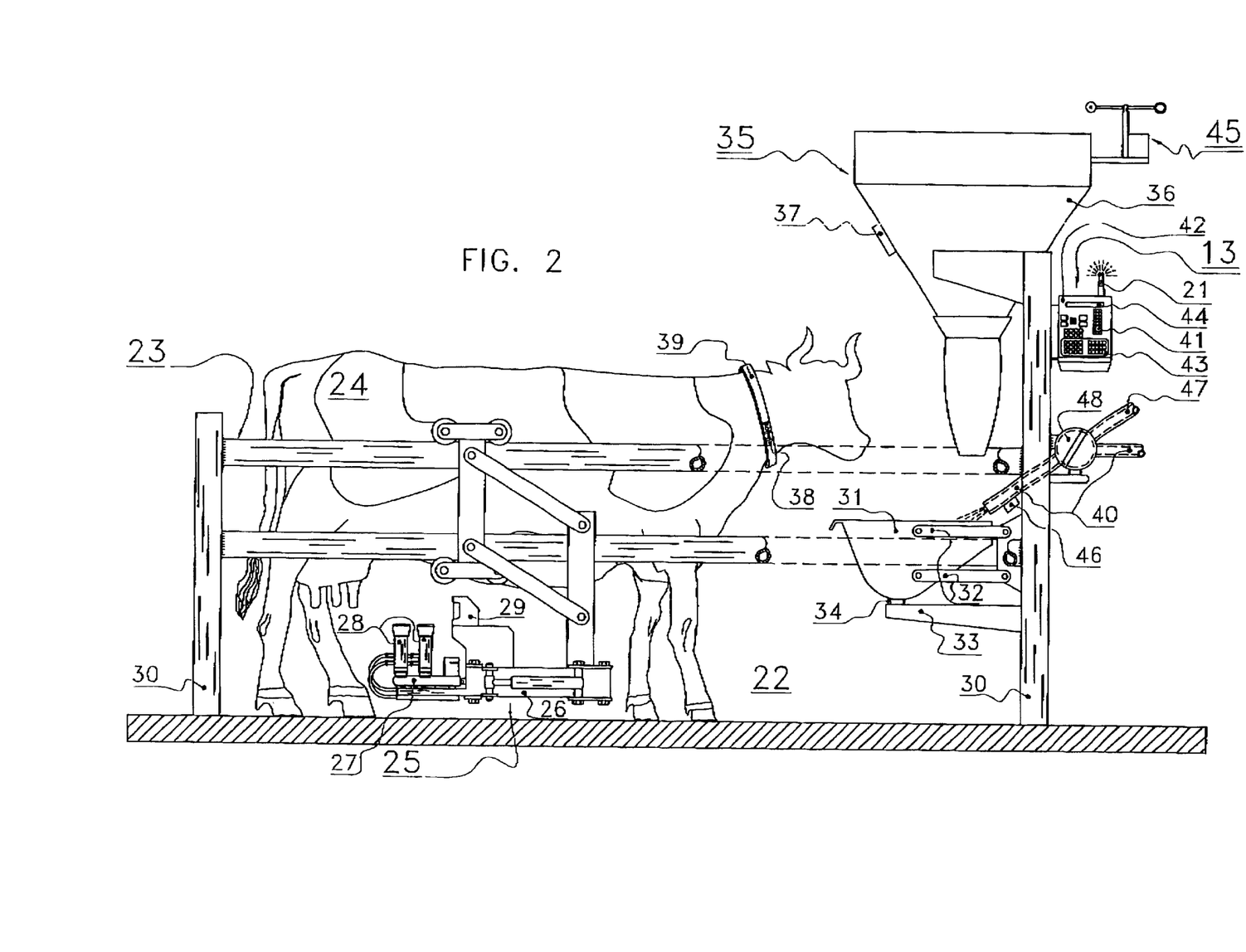
FIG. 2 is a schematic side view of an embodiment of a device according to the invention in the form of a milking compartment.

Identification means 7 are provided for identifying each individual animal that consumes feed at the feed device in accordance with the invention. In the embodiment shown the identification means 7 are disposed on framework 1, but can also be disposed at other places, such as for example, at feed troughs 6. With the aid of identification means 7 the identify of the animal present at a feed trough 6 is automatically detected and established. With the aid of data stored in the memory of, for example, second control device 19, the amounts of feed types intended for that animal can then be supplied in a particular ratio or order or both. With the aid of a known weighing device the amount conveyed to receptacle 12 by a first conveyor 11 can then be checked. Second control device 19 further controls, with the aid of data from computer 8 and animal identification means 7, movement of the tube-shaped chute 3 so that the latter is located just over the correct feed trough 6. Second control device 19, under control of computer 8, further controls the drives of conveyors 11. A first control device 13, as seen in FIG. 2, may also be controlled by data from computer 8. FIG.

FIG. 2 is a side view of an embodiment of a device according to the invention in the form of a milking compartment 22. Milking compartment 22 comprises a framework 23 disposed to confine a cow 24 during her stay in the milking compartment 22. On one side of milking compartment 22 there is a milking robot 25. Milking robot 25 comprises, for example, a robot arm 26 having at its end teat cups 28 supported by a carrier 27. On robot arm 26 near teat cups 28 is further disposed a sensor 29 with the aid of which the position of the teats of a cow to be milked can be determined.

Near the front side of milking compartment 22, a feed trough 31 is fastened to a post 30. In the embodiment shown the feed trough 31 is connected to a post 30 by means of a parallelogram hinge construction 32. Feed trough 31 is supported at its lower side by a supporting beam 33. Between supporting beam 33 and the lower side of feed trough 31 there is further disposed a measuring device 34 by means of which the weight of feed trough 31 and its contents can be determined. In the present embodiment measuring device 34 comprises a piezo-element. It will be obvious that the invention is not limited to the disclosed specific manner by which the contents of the feed trough can be measured, and hereinafter some alternative ways of determining the weight of the feed trough and its contents will be described.

Over feed trough 31, fitted to the post 30, is a feeding station 35 comprising a plurality of hoppers, each for containing one type of feed, and a tube-shaped chute (analogous to the feeding column 3 described above). Feeding station 35 comprises a reservoir 36 containing hoppers for holding different types of feed. Connected to the outer wall of reservoir 36 is a receiver 37 constituting, in part, an identification means. Receiver 37 receives signals from a transmitter 38 disposed, for example, on a collar 39 around the neck of cow 24. Different types of identification means known by those skilled in the art may be utilized in the invention and the invention is thus not limited to one type of identification means. The receiver and the transmitter may also be disposed at different places. For example the receiver may be disposed on feed trough 31 and the transmitter may be implanted in the cow.

Near the upper side of feed trough 31 there is further fitted to post 30 a liquid supplying device 40, for example a sprayer, with the aid of which an amount of liquid, for example water, or a viscous liquid, such as syrup or treacle, can be added to the feed present in feed trough 31.

The device operates as follows:

After cow 24 has entered milking compartment 22 and transmitter 38 has come into the receiving range of receiver 37, cow 24 is automatically identified by the identification means. Data for each cow relating to feed types and the amount thereof to be offered to each cow per feeding run are stored in a known manner in a memory 41 of a computer 42 of a first control device 13, while, of course, the time window and the feed balance associated therewith are taken into account. First control device 13 is controlled by computer 8 (see FIG. 1) which may be connected in a wireless manner with first control device 13. For that purpose each control device 13 and 19 as well as computer 8 are provided with a transmitter-receiver, 21 and 21' as shown.

When a cow 24 has been identified, the identification means send a signal to computer 42 which, with the aid of the data stored in memory 41, controls feeding station 35 in such a way that an amount and ratio of types of feed appropriate for cow 24 are supplied, possibly in a particular order.

Besides, the amount of feed consumed by a cow can be optimized further by adding an amount of liquid to a feed type by means of liquid supplying device 40. The amount of liquid to be added for each cow feed for the type supplied is determined for each cow with the aid of data in the memory 41 of computer 42. Said data contain per cow the relationship between the type of feed intake and the amount of liquid to be added thereto for the desired milk production. Thus, after a cow 24 has been identified, computer 42 issues a signal to liquid supplying device 40 for supplying the relevant amount of liquid. For that purpose computer 42 uses the relevant data from memory 41.

For the first use of the device according to the invention, such data can be inputted into memory 41 by making use of inputting means, such as a keyboard 43. This can be done by a farmer who inputs the desired values for each cow and feed type according to his experience. For facilitating the input and for checking the functioning of the device during the use thereof, computer 42 comprises a display screen 44.

The feeding station preferably comprises measuring means 45 for measuring the atmospheric conditions, such as temperature, air humidity, atmospheric pressure, wind speed and the like. The data in memory 41 can contain for each cow a relation between the amount of liquid to be added per feed type depending on environmental conditions, which relation leads to a desired feed intake.

Thus in the embodiment described, after a visit of a cow to the milking compartment the following data are stored in the memory: the amount consumed of each feed type, the amount of liquid added, if any, for each feed type, the ambient temperature, air humidity, atmospheric pressure, wind speed, and milk yield, and possibly the order of the feed types supplied. When a cow has consumed all the feed supplied to it, said data are processed by the computer into the memory, so that at a next visit of the cow under the same circumstances the same amounts of liquids can be added to the relevant feed types.

When the cow has not consumed all the feed, at the next visit of the cow to the milking compartment it is possible to change the amount of liquid which is added to the feed types or the ratios and amounts feed types which are offered to such cow. For changing the amount of liquid to be added, different approaches can be used. For example, the amount of liquid to be added can be increased at the next visit by 5% (another increase percentage, or even a decrease, is also possible, of course), after which the amount of feed consumed is measured. Accordingly, the amount of liquid is changed automatically for each visit of the cow to the milking compartment until the cow has consumed the entire amount of the type of feed supplied. In the latter case the data are recorded by the computer in the memory as standard values. Otherwise, they are stored temporarily, for determining the standard values. The computer can then be programmed so that certain data are given priority for determining the amount of liquid to be added. An example of a priority order is: amount consumed of the type of feed, milk yield, air humidity, temperature, atmospheric pressure, and wind speed. Of course, another order, in dependence on the wishes of the farmer, may be used. Thus there is provided an iterative method to determine the amount of liquid to be added for obtaining optimal feed intake. This supply of feed by adding liquid can also be used for the feeding column. It will further be appreciated that adding or determining the order of supply of types of feed may be provided analogously to determining the amounts of liquid to be added.

The liquid supplying device 40 may be provided with a heating device or cooling device 46 for providing the liquid, at a temperature suitable for optimal feed intake and possibly improving the flow of viscous liquids. The operation of device 46 can also be controlled by computer 42 with the aid of data from the identification means and the data from memory 41.

The device is provided with an additive device 47 for introducing additives to the feed. Said additive device can be controlled by computer 42 which controls, for example, a valve 48 based on data from the identification means and data from memory 41. As a result thereof for each cow individually, particular additives, such as medicines, vitamins, fish oil, salts, minerals, and the like, can automatically be added to the feed.

By means of measuring device 34 it is further determined how much feed a relevant cow has consumed during its feeding time. The amount of the feed type and the amount of liquid added can also be determined separately. Such data are used for continuously updating the data in the memory and possibly adapting them to a changing eating behavior by the cow.

As mentioned in the foregoing, some alternatively for determining the weight of a feed trough, in particular of the amount of feed present therein, will now be described.

Figure 3:
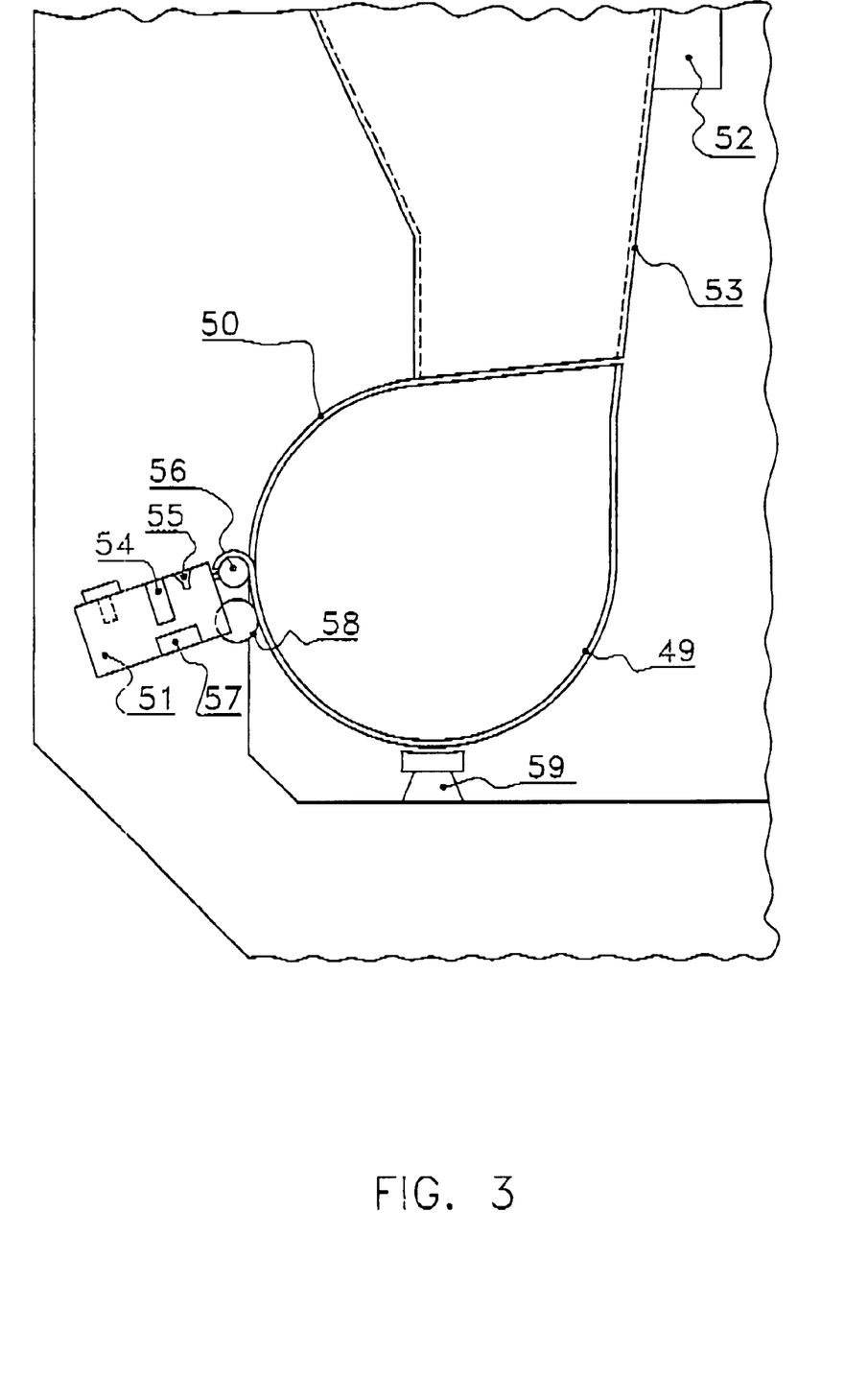
FIG. 3 shows a first embodiment of means for measuring the amount of a type of feed consumed by an animal in the feeding column or a feeding station according to the invention.

FIG. 3 shows schematically a first embodiment of a feed trough 49 for containing feed. An entrance opening 50 gives an animal, for example, but not necessarily exclusively a cow, access to feed trough 49. A known identification means comprising an animal identification device 51, is disposed near feed trough 49 which recognizes a particular animal approaching feed trough 49 and wishing to make use of it. With the aid of data from the animal identification device 51, a control device 52 supplies an amount of a particular type of feed to feed trough 49, the amount of said type of feed being received into feed trough 49 via, for example, a tube-shaped chute 53.

By weighing the amount of the type of feed present in feed trough 49, it can be determined how much of a particular type of feed is consumed by a particular animal, and also whether unconsumed feed remains present in the feed trough. The means for weighing the feed present in the feed trough are preferably connected with the control device for supplying, with the aid of data both from the animal identification device and the means for weighing, an amount of a type of feed to the feed trough, while the amount of a type of feed left by the previous animal can thus be taken into account.

In FIG. 3 the means for weighing the feed present in feed trough 49 comprises a feed trough 49 which is pivotable about a pivot axis 56. The degree of pivoting is determined by the weight of the feed present in feed trough 49. There is provided a device 57 for determining the degree of pivoting of feed trough 49, and for deducing therefrom the weight of feed present in feed trough 49. Device 57 for determining the degree of pivoting of feed trough 49 comprises a measuring roll 58 which is in contact with the feed trough. From the degree of rotation of measuring roll 58 the degree of pivoting and thus the amount of feed in feed trough 49 can be determined.

Because of the fact that device 57 and roll 58 for determining the degree of pivoting of feed trough 49 are integrated in the animal identification device 51, the construction is a compact one.

Figure 4:
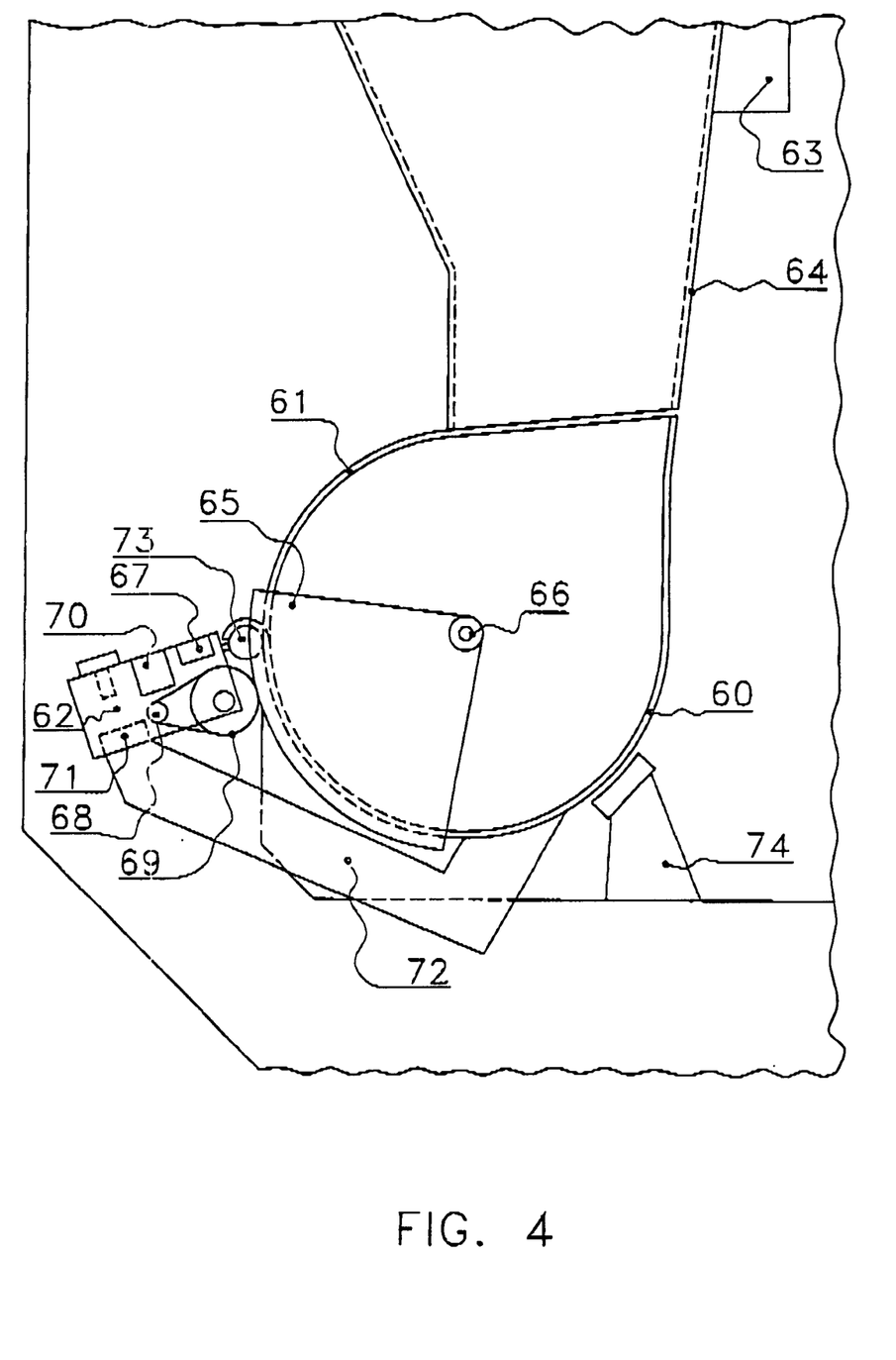
FIG. 4 shows a second embodiment of means for measuring the amount of a type of feed consumed by an animal in a feeding column or a feeding station according to the invention.

Alternatively or additionally, as shown in FIG. 4, the pivoting-determination device 70 for determining the degree of pivoting of a feed trough 60, and for deducing therefrom the weight of the feed present in feed trough 60, may comprise a dynamometer 71. In the embodiment shown, feed trough 60 bears on dynamometer 71 via a supporting arm 72. In this situation feed trough 60 pivots about a pivot axis 73. Dynamometer 71 is preferably included in the animal identification device 62.

In the embodiments shown in FIGS. 3 and 4, even small differences in weight can be measured, because the pivot axes 56 and 73 and the measuring roll 58 and the dynamometer 71 are located at a short distance from each other.

For preventing in undesired cases of malfunction, for example when the animal pushes the feed trough downwardly with force, the measuring roll, the dynamometer or the like from being damaged, in both embodiments there may be provided a safety support cam 59 (FIG. 3) and 74 (FIG. 4) for supporting feed troughs 49 and 60.

Figure 5:
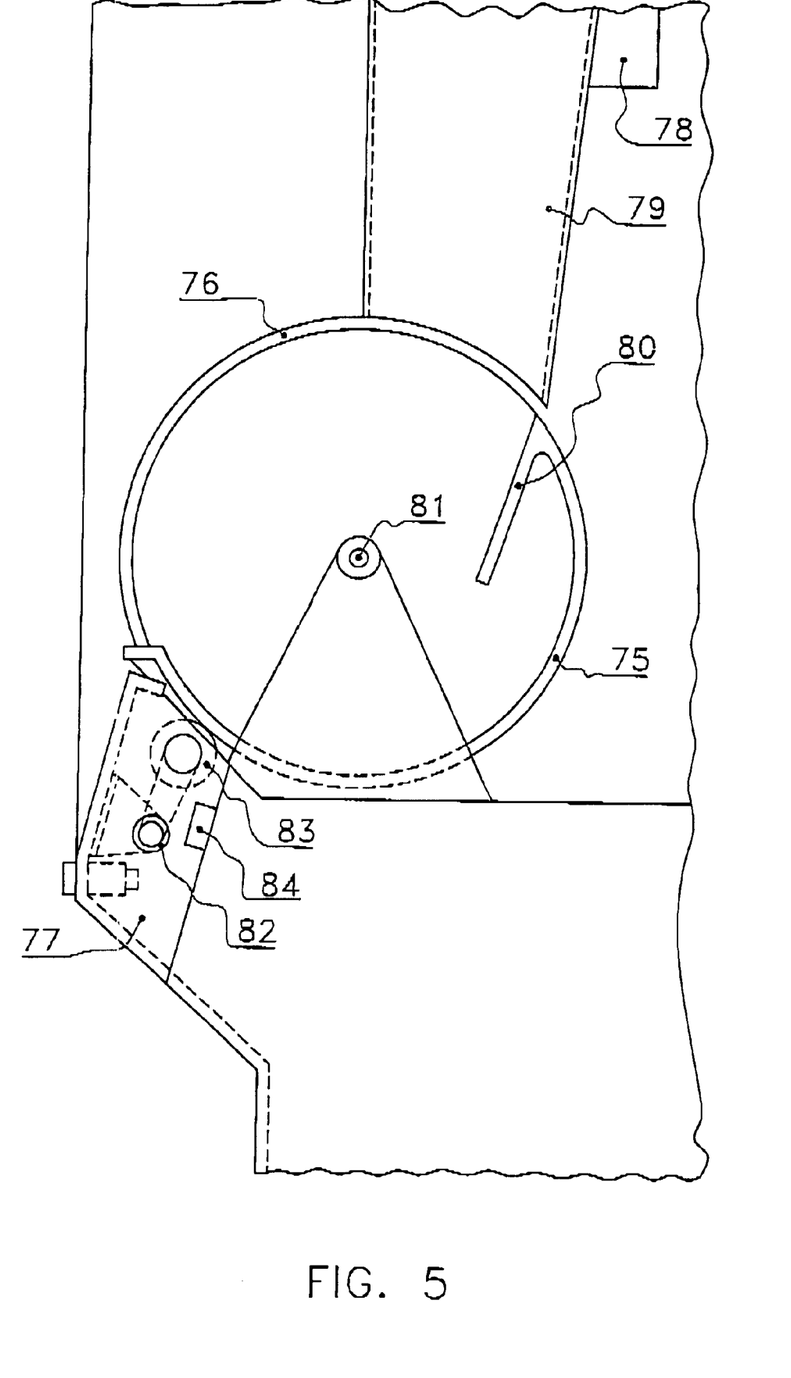
FIG. 5 shows a third embodiment of means for measuring the amount of a type of feed consumed by an animal in a feeding column or a feeding station according to the invention.

In a third embodiment, as shown schematically in FIG. 5, the means for weighing the feed present in the feed unit comprises a movable feed trough 75. Feed trough 75 is moved in a reciprocating manner by a motor 82 by which a roll 83 is driven. As a result of this movement there is created a torque, the magnitude of which is determined by a device 84 that measures the magnitude of torque. From the torque so determined, device 84 deduces the weight of the amount of a type of feed present in the feed trough. The exact correlation between torque and amount of feed can be previously determined by simple calibration tests.

The embodiment according to FIG. 5 has a compact construction because the motor 82 for moving feed trough 75, and device 84 for measuring the magnitude of the torque during moving and for deducing the weight of the amount of the sort of feed present in feed trough 75 from the measured magnitude of the torque, are integrated in the animal identification device 77.

The feed trough may be provided with means for deterring an animal wishing to make use of the feed trough at an undesired point of time, or preventing that animal from making further use of the feed trough (for example for the remaining types of feed) or making further use of the feed trough impossible for that animal, with the aid of data from the animal identification device. As a result thereof it is possible to deter, in a simple, efficient and cheap manner, animals which are not eligible to be fed from putting their heats into the feed trough, and to teach an animal first to consume the type of feed present in the feed trough before another type of feed is offered.

In the first embodiment shown in FIG. 3, the means for deterring use by an animal comprises a loudspeaker 55 for issuing an animal-deterring sound. Alternatively or additionally the means for deterring use by an animal may comprise a lighting device 54 for producing an animal-deterring light. In particular when several feed troughs are juxtaposed, the use of deterring light is desirable, because this light can be focused such that it only produces an effect for one particular feed trough.

In the second embodiment according to FIG. 4, the means for preventing use by an animal comprises a closing means 65 which is movable across the entrance opening 61. When closing means 65 is moved across the entrance opening 61, the contents of the feed trough 60 become inaccessible to a particular animal. In the embodiment shown the closing means 65 is constituted by a vessel-shaped element capable of rotating about an axis 66. Said axis 66 may be constituted by a motor-driven axle, said motor being controlled with the aid of data from the animal identification device 62.

Additionally there may be provided a voltage supplying device 67 for supplying an animal-deterring electrical charge to the closing means 65. Animals approaching the feed trough 60 undesirably often make contact with the feed trough 60. They will in particular touch closing means 65 with their noses. By connecting precisely those components of the feed trough that are regularly touched by animals with the voltage supplying device 67, it is possible to deter a particular animal very locally. Accordingly, such a voltage supplying device 67 can also be used, as such, independently of a closing means.

The second embodiment also comprises a control device 63 and a tube-shaped chute 64 for the feed.

The devices described can be designed extremely compactly when the means for deterring an animal are integrated with the animal identification device. Alternatively the means for deterring an animal may be separate means.

In the third embodiment according to FIG. 5, the closing means is constituted by the feed trough 75 itself which is movable. In the situation shown in FIG. 5, feed trough 75 is rotatably disposed relative to an axis 81, which axis 81 may be constituted by a motor-drive axle, said motor being controlled by the animal identification device.

In order to prevent feed falling from feed trough 75 when the entrance opening 76 is closed, feed trough 75 is provided with a wall portion 80 for catching feed remaining in feed trough 75. Said wall portion 80 can also act as a feed guiding means for feed supplied through the tube-shaped chute 79 to feed trough 75.

As described, in the second and third embodiment there is provided a simple but reliable construction due to the fact that the closing means rotates about an axis, the closing means being driven by a motor controlled by the animal identification device. For the purpose of providing, besides a simple but reliable construction also a compact construction, rolls 69 and 83 are preferably driven by motors 68 and 82 respectively, said rolls 69 and 83 being in contact with closing means 65 and 75 respectively. In the third embodiment, feed trough 75 thus bears on the animal identification device 77 via roll 83.

Although for roll 83 a separate torque roll may be used, it is preferred for roll 83 to perform both the function of driving the closing means, in this case feed trough 75 itself, and the function of a torque measuring roll. Of course, in the alternative case in which the feed trough 75 is moved by axle 81 driven by a motor, the torque can also be measured via that motor.

Figure 6:
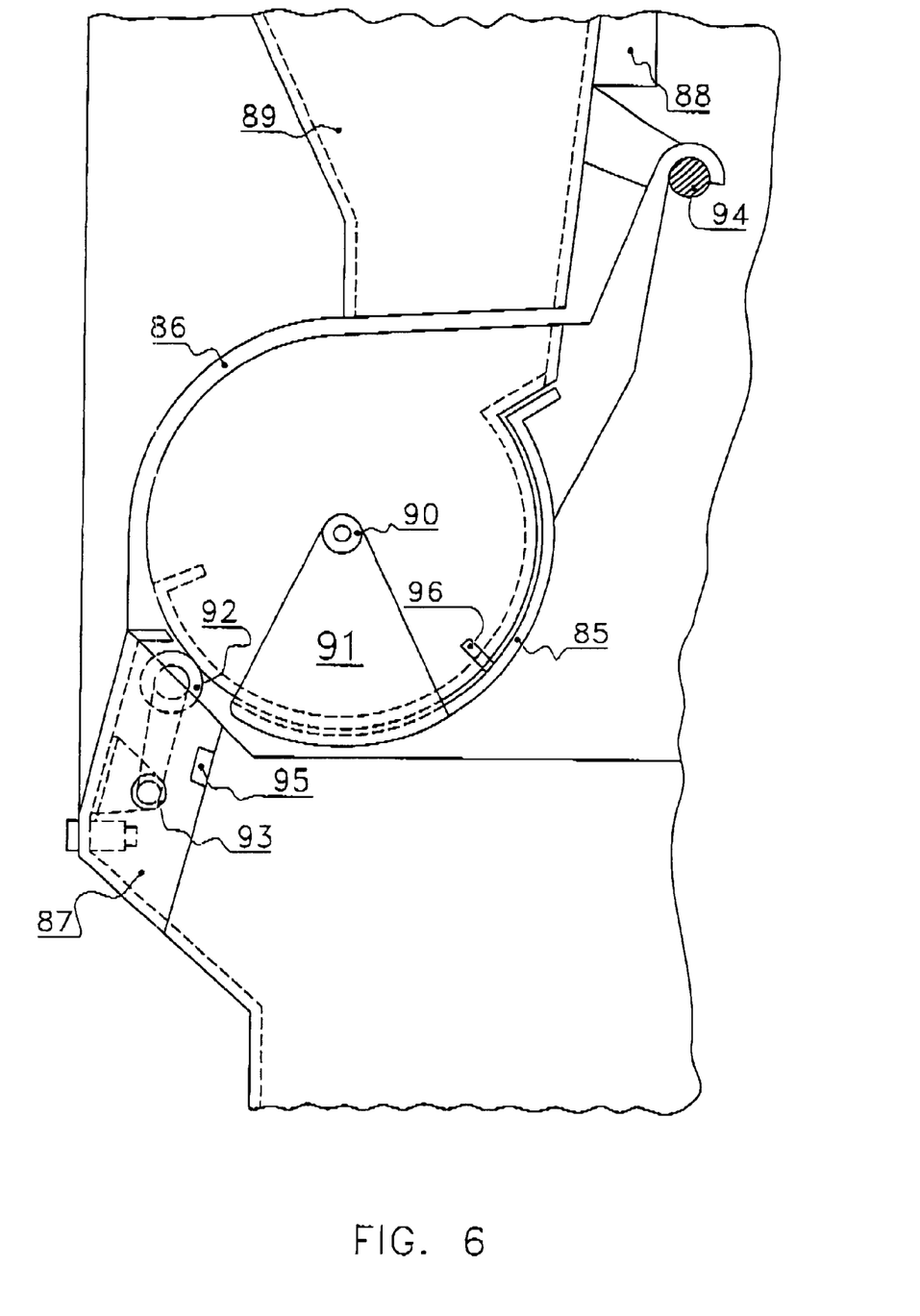
FIG. 6 shows a fourth embodiment of means for measuring the amount of a kind of feed consumed by an animal in a feeding column or a feeding station according to the invention.

The fourth embodiment, as shown in FIG. 6, comprises both means for preventing an animal wishing to make use of the feed trough 85 with the aid of data from the animal identification device 87, and means for weighing the feed present in the feed trough 85.

The means for preventing are constituted by a separate closing means 91 which is rotatable about an axis 90. Closing means 91 is rotated by a roll 92, capable of contacting closing means 91, and is driven by a motor 93 which is controlled by the animal identification device 87.

In this embodiment the weighing means are constituted by a feed trough 85 which is rotatable about an axle 94. Feed unit 85 can be moved into contact with roll 92, and is subject to a reciprocating movement by correct operation of motor 93 by which roll 92 is driven. By the movement of feed trough 85 a torque is generated which can be measured by a torque measuring device 95.

In the situation shown in FIG. 6, roll 92 makes contact with feed trough 85 and the latter can be set in motion for determining the amount of the type of feed present in feed trough 85. After an animal has consumed the type of feed, the amount of remaining sort of feed can be determined by torque measurement. Then roll 92 is controlled by motor 93 in such a way that feed trough 85 partially covers entrance opening 86. A catching device 96 on the feed trough 85 contacts and moves closing means 91 until the latter comes into contact with roll 92. Then roll 92 moves closing means 91 in a clockwise direction as seen in FIG. 6 so that it covers the entire entrance opening 86. As a result of the fact that feed trough 85 is no longer in contact with roll 92, feed trough 85 returns to its starting position in which a next type of feed can be supplied via the tube-shaped chute or channel-shaped chute 89.

Figure 7:
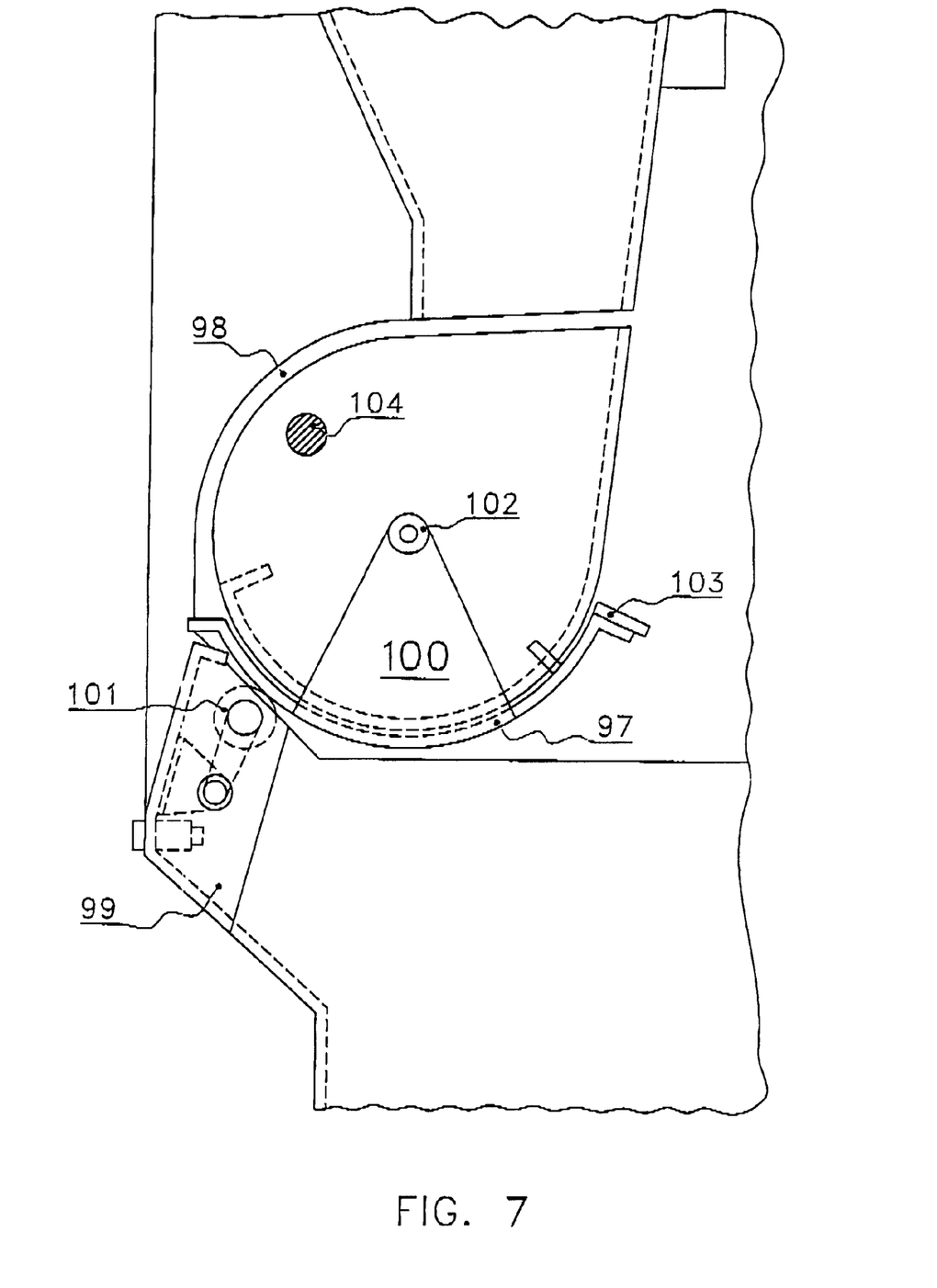
FIG. 7 shows a fifth embodiment of means for measuring the amount of a type of feed consumed by an animal in a feeding column or a feeding station according to the invention.

The fifth embodiment according to FIG. 7 differs from that of FIG. 6 by the location of the pivot axle 104 about which the feed trough 97 rotates. Pivot axle 104 is disposed close to a roll 101 for driving the feed trough 97 and measuring the torque, for measuring very small differences in amount of feed. There is also provided a stop 103 for preventing superfluous movement of feed trough 97. The closing means 100 for closing the entrance opening 98 pivots about an axis 102.

According to the invention, the supply of various types of feed to a feed trough in a particular order or amount or both and ratio is performed in dependence on a so-called time window, having a predetermined period of time, for example, one day (although also other periods are possible) or for example a period defined by the visit of for example forty cows to the feeding parlor. To that end the calculating device of the computer 8 determines the total amount of a feed type (or of all types of feed) that has been consumed by that animal in the time window preceding the on-going visit of the animal. The calculating device further determines the difference between the predetermined amount of a type of feed (or of all types of feed) which is supplied to the animal in said predetermined period (for example the daily ration) and the total amount of consumed in the time window. Said difference is the feed balance which can be supplied to the animal. This feed balance is supplied to the animal under control of computer 8, which can take place at one time, in feed portions or in other sub-amounts of the feed balance.

As an example consider a daily feed ration for a particular cow which comprises following four types of feed: twelve kilograms of concentrate, twenty-four kilograms of ensilaged grass, six kilograms of corn and three kilograms of brewer's grains. However, it will be appreciated that other types of feed (and amounts) can be added or particular types of feed can be replaced by other types, or such variating may be combined. As portion size, five percent of the feed balance is used, which can be calculated by the calculating device of computer 8. Depending on the size of the feed trough, a maximum can be determined, for example, two kilograms, of the feed portion. There is further chosen a minimum portion size of two hundred grams. It will be appreciated that depending on the size of the device and the measurement accuracy, other values can be used. If five percent of the feed balance is less than two hundred grams (the minimum portion size), the minimum portion size is supplied to the feed trough.

A cow that has just reported, always gets a first portion which is equal to the minimum portion size; this serves to verify whether or not the cow actually wishes to eat. When after comparison by a comparing device of the computer the comparison result indicates that the calculated feed portion size for a particular type of feed is smaller than the minimum feed portion size for this type of feed, the computer controls the device in such a way that one minimum feed portion size composed of other types of feed is supplied to the animal.

When a cow reports the computer calculates how much feed that cow has consumed during the time window immediately preceding that the point of time, for example: three kilograms of concentrate, nine kilograms of ensilaged grass, two kilograms of corn and one kilogram of brewer's grains. In that case the feed balance is nine kilograms of concentrate, fifteen kilograms of ensilaged grass, four kilograms of corn and two kilograms of brewer's grains. This feed balance is supplied in portions to the cow. This procedure is continued and the cow continues to eat up her portions.

When a cow leaves the feed trough an amount of feed may remain therein. For further determinations of the supply of feed, this remaining feed is taken into account. Possible filling up of a feed trough is taken into account by the computer by making use of a comparison device for comparing the amount of remaining feed with a minimum threshold value, the computer only controlling the device for supplying a type of feed to the feed trough when the comparison indicates that the amount of remaining feed is below the minimum threshold value.

A blocking time can for example be fixed at thirty minutes, which means that within the blocking time after a cow has eaten, said cow is not again admitted to a feed trough. Also when the cow is expected at the milking compartment within half an hour, access will be refused. The relevant points of time, such as the point of time of supply of feed or the point of time when the cow leaves the feed trough (after having eaten or not) are stored.

According to the invention there can further be provided variations in the offered feed in that the computer 8 controls the relevant components in such a way that the amount of a type of feed to be supplied to the relevant feed trough 6, 31, 49, 60, 75, 85 or 97 depends on the measured values of relevant variable parameters. For example, depending on the measured value more concentrate and ensilaged grass, but less corn and brewer's grains may be supplied. On the other hand, under changing circumstances more ensilaged grass, and less corn, concentrate and brewer's grains may be supplied. It will be appreciated that the amount for each type of feed is controlled by the computer.

The ratio and amounts are also determined depending on preferences, environmental conditions as well as on the desired economic results.

It has been found for example that one cow prefers brewer's grains to other types of feed, whereas another cow prefers concentrate and finds brewer's grains not tasty at all. The invention may be advantageous to prevent that the latter cow, just because brewer's grains is present in the offered feed, eats less than desirable. For example, in that situation, when brewer's grains does not contain a nutritive ingredient that the other types of feed do contain, brewer's grains is not offered to that cow. When that cow needs an ingredient that is only present in brewer's grains, the control device is capable of controlling the relevant components in such a way that the composition of the mixture is such that the cow still consumes the brewer's grains. Such a control by the computer can take place due to the fact that such data are stored in the memory of the computer.

It has further been found that in humid circumstances cows prefer drier feed mixtures, so that in that case more dry ensilaged grass, and less of the wetter concentrate is supplied.

The atmospheric-condition-measuring means described above can then ensure an automatic adaptation of ratios or amounts, or both, depending on the measured temperature, humidity, atmospheric pressure, wind speed and the like.

As with human beings, the optimal feed intake of a cow may depend on the point of time of the day, and thus it is possible to distinguish for example breakfast, lunch and dinner. Also these data may be included in the memory. When a clock, which is not explicitly shown in the drawings but is implicitly present in the computer, indicates the point of time of the day and issues a corresponding time signal to the control device, the point of time of the day may automatically be taken into account. It has further been found that there is for each cow a season-dependence in the ratio and amount of types of feed offered to ensure an optimal intake, which can automatically be taken into account by means of the clock.

Besides, the eating rate (from which the preferences of the animal can be deduced), the milk yield, and the amount of energy or protein or fat or minerals or amino acids or any combination thereof, and the like present in the milk produced by a cow appear to be suitable for being used as data in the memory for controlling the ratio and amount of the types of feed to be supplied.

Such data, analogously to what has been described above in relation to adding liquid, can be inputted into the computer by means of the keyboard or another comparable inputting device for inputting data into the memory. Such data can also automatically be generated by the control device itself, by providing variation in the type of feed to be offered and by determining the feed intake resulting therefrom, including the economic results therefrom, and by automatically varying the offered feed depending on the results. This feedback can also take a developing animal into account.

Because the magnitude of data which can be used by the control device for generating the control signal, there can also be provided a priority algorithm, as a result of which, on determining the order of types of feed to be offered, certain data (for example data relating to air humidity) may be given priority over another data (such as data relating to eating rate) when generating the control signal. Moreover, weight factors can be allotted to the various data, so that it is possible to take several data into account simultaneously. Such programs and algorithms are known to persons skilled in the art.

According to the invention, additionally or alternatively there can be provided variation in the offered feed due to the fact that computer 8 controls the relevant components in such a way that at least one type of feed is supplied at least substantially separately from the other types of feed to the relevant feed trough 6, 31, 49, 60, 75, 85 or 97. Thus the order in which the types of feed are offered to the cow can be varied. For example the order may be: concentrate, ensilaged grass, and a mixture of corn and brewer's grains, but may also be: ensilaged grass, a mixture of corn and concentrate, and separately brewer's grains. Besides, all types of feed can also be supplied at least substantially separately, of course. It will be understood that the amount of each type of feed is also controlled by the control device.

The control signal issued by the computer can control the device in such a way that the order in which types of feed are supplied to the feed trough separately from each other is completely arbitrary, so that each time when the cow arrives at the feed trough it is a surprise which type of feed is supplied first.

However, the order can also be determined based on the preference of the relevant cow, and depending on the environmental conditions, as well as on the desired economic results.

It has been found for example that one cow prefers brewer's grains to other types of feed, whereas another cow prefers concentrate and does not find brewer's grains tasty at all. The invention may be advantageous to prevent that the latter cow, just because brewer's grains is present in the offered feed, eats less than desirable. For example, in that situation, if the brewer's grains does not contain a nutritive ingredient that the other kinds of feed do contain, brewer's grains are not offered to that cow. When that cow needs an ingredient that is only present in brewer's grains, the computer is capable of controlling the relevant components in such a way that precisely brewer's grains is offered as the first type of feed. At this point of time, before the cow begins to eat, she has the most appetite and will be more inclined to consume her portion. This inclination can be reinforced if, after the control device first offers brewer's grains, it then offers the type of feed which that cow finds tastiest. Such a control by the computer can take place because such data are stored in the memory of the computer.

Because the number of possible combinations between data applicable to each cow extremely large, for the sake of simplicity it is impossible to describe all possible combinations. With the aid of the above-mentioned information, however, it is possible for a person skilled in the art to obtain, depending on such person's wishes, the desired amounts and ratios of types of feed to be offered by means of simple trial and error tests. It will further be appreciated that the functioning and control of components of the feeding column can also be applied to the feeding station and vice versa. An optimal supply of feed can further be obtained when the sliding window of time has a length which is animal-dependent or lactation period-dependent or season-dependent or weather-dependent, or dependent on any combination thereof. For example, during the lactation period of an animal the period for the window of time may be shorter (for example it may have a length of twenty-three hours, or the period determined by the visit of thirty-five cows to the feeding parlor) than outside the lactation period (where the length is for example twenty-four hours, or forty cows). Furthermore, based on how long the cow has been in the lactation period, the lengths of the time window period may be different, for obtaining, for example, an optimal milk yield.

Although we have disclosed the preferred embodiments of our invention, it is to be understood that it is capable of other modifications and adaptations within the scope of the following claims.

What is claimed is:

1. An apparatus for automatically supplying a predetermined amount of feed to an animal during a predetermined period, which apparatus comprises an area for receiving and feeding the animal in which the animal is at least in part confined, animal identification means for identifying an animal present in said area, a computer for automatically controlling the supply of feed to be consumed by an animal in said area, measuring means for determining the amount of feed consumed by an animal in said area after receiving a supply of feed therein and transmitting information as to the amount of said feed so consumed to a memory of said computer, a calculating device in said computer for determining the total amount of feed consumed by such animal during said predetermined period and also the amount of food consumed by such animal immediately after said animal is identified as being in said area by said animal identification means, said calculating device determining the difference between said predetermined amount of feed and, the total amount of feed actually consumed by the animal in said predetermined period, said computer controlling the supply of feed to be consumed by said animal during said predetermined period of time by adding a feed balance to said feed actually consumed by the animal an amount of further feed not greater than the difference between said predetermined amount of feed and the actual amount of feed consumed by said animal during said predetermined period.

2. An apparatus in accordance with claim 1, wherein said computer controls the providing of said feed balance to said animal in feed portions.

3. An apparatus in accordance with claim 2, wherein each said feed portion comprises at least a minimum feed portion size.

4. An apparatus in accordance with claim 3, wherein said calculating device calculates the feed portion sizes of each said feed portion.

5. An apparatus in accordance with claim 4, wherein said calculated feed portion size is approximately 5% of said feed balance.

6. An apparatus in accordance with claim 5, wherein said computer includes a comparing device for comparing a calculated feed portion size with the minimum feed portion size and when the comparison result indicates that the calculated feed portion size is smaller than the minimum feed portion size, said computer controls the device so that the minimum feed portion size is supplied to said animal.

7. An apparatus in accordance with claim 3, wherein when an animal is detected by said animal identification means at said area, said computer controls a device so that one said minimum feed portion size is initially supplied to said animal.

8. An apparatus in accordance with claim 1, wherein said computer includes a blocking period and said feed comprises a plurality of different types of feeds, said computer only controlling a device for supplying a selected type of feed to said animal after, counting from the last point of time the feed was supplied to said animal, said blocking period has elapsed.

9. An apparatus in accordance with claim 1, wherein said computer stores in said memory the points of time when each animal reports to and departs from said area.

10. An apparatus in accordance with claim 1, wherein said area includes a feeding trough and said measuring means comprises weighing means for determining the weight of feed in said trough.

11. An apparatus in accordance with claim 10, wherein said computer stores in said memory the date said measuring means for determining the amount of feed consumed by the animal makes such determination.

12. An apparatus in accordance claim 11, wherein said calculating device determines the difference between the weight of feed supplied to said trough and the weight of the remaining feed present in said trough in calculating said feed balance.

13. An apparatus in accordance with claim 12, wherein said computer includes a comparing device for comparing said weight of remaining feed with a minimum threshold value, said computer only controlling the supplying further feed to said trough when the comparison provided by said comparing device indicates that the weight of remaining feed in said trough is below said minimum threshold value.

14. An apparatus in accordance with claim 1, comprising supply means for automatically supplying several types of feed to an animal during a said predetermined period.

15. An apparatus in accordance with claim 14, comprising mixing means for mixing different said types of said feed before said different types of feed are supplied to said area.

16. An apparatus in accordance with claim 14, wherein said computer controls said supply means so that at least one of said types of feed is supplied to said area at least substantially separately from the other said types of feed.

17. An apparatus in accordance with claim 1, wherein said area comprises a stall of a plurality of stalls and said computer controls the apparatus so that feed is first supplied to that stall wherein an animal in said area has been most recently detected by a said animal identification means.

18. An apparatus in accordance with claim 1, wherein said area comprises a milking compartment, the apparatus further comprising a milking robot for automatically milking a dairy animal in said milking compartment, said area including a feed trough for feeding an animal in said milking compartment.

19. An apparatus in accordance with claim 1, wherein said area is included in a feeding column and comprises a feed trough.

20. An apparatus in accordance with claim 1, which comprises supply means for automatically supplying different types of feed to said area, and a parameter measuring means for measuring a momentary value of a variable parameter and for issuing a parameter value signal to said computer, said computer controlling the supplying of said types of feed to said area by means of control signals to said supply means so that said types of feed are supplied in predetermined amounts and in a predetermined order, said computer being provided with a processing device for processing said parameter value signal into said control signal.

21. An apparatus in accordance with claim 1, which comprises supply means for automatically supplying different types of feed to said area, and a parameter measuring means for measuring a momentary value of a variable parameter and for issuing a parameter value signal to said computer, said computer controlling the supplying of said types of feed to said area by means of control signals to said supply means so that said types of feed are supplied in a predetermined ratio of said feed types as a mixture, said computer being provided with a processing device for processing said parameter value signal into said control signals.

22. An apparatus in accordance with claim 1, which comprises parameter measuring means that affect the computer controls of the apparatus, said parameter measuring means being selected from a group consisting of an atmospheric-condition measuring means for measuring atmospheric conditions, a time measuring means for measuring the point of time of a day, a further time measuring means for measuring the period of time of a year, means for measuring the physical condition score of each animal identified by said identification means, means for determining for each animal its rate of consumption, means for measuring for each animal its milk yield, means for measuring the amounts of protein or fat or minerals or amino acids or any combination thereof in milk obtained from each animal, means for measuring the amount of each type of feed consumed by each animal or any combination of the foregoing.

23. An apparatus in accordance with claim 1, wherein feed is conveyed to said area by conveying means which comprises a first conveyor for conveying an amount of feed from a hopper to a receptacle and a second conveyor for conveying an amount of feed from said receptacle to a feed trough in said area.

24. An apparatus in accordance with claim 23, wherein said receptacle is provided with a weighing means for measuring feed present in said receptacle.

25. An apparatus in accordance with claim 23, wherein said receptacle includes a bottom which is adapted to be opened and closed.

26. An apparatus in accordance with claim 25 comprising controlling means for controlling the opening and closing of said bottom of said receptacle.

27. An apparatus in accordance with claim 23, wherein said second conveyor comprises a tube-shaped chute.

28. An apparatus in accordance with claim 23, wherein said second conveyor comprises a channel-shaped chute.

29. An apparatus in accordance with claim 23, comprising closing means for selectively closing said trough and controlling means for controlling the operation of said closing means.

30. An apparatus in accordance with claim 1, wherein the length of said predetermined period is at least in part dependent on one or more of the following factors: the physical condition of the individual animal, or the lactation period of the individual animal, or the season of the year, or the weather.

31. A device in accordance with claim 1, wherein said computer comprises timing means for determining the point of time of the supply of feed to each animal received by said apparatus and said predetermined period is a predetermined length of time.

32. An apparatus for supplying a plurality of different feeds to animals during a predetermined period based on the nutrition needs and food preferences of each individual animal that uses the apparatus, the apparatus comprising a plurality of containers, each of said containers containing a different type of feed, a computer, a feed trough, delivery means controlled by said computer for selectively delivering said types of feed to said feed trough, identification means for identifying each animal that consumes said feed types at said trough, said computer including a memory which contains for each animal identified by said identification means data relating to the types of feed and the amounts thereof such animal should consume during each said predetermined period and a preferred order for each type of feed to be delivered to said trough while such animal is at said trough, measuring means at said trough for measuring the amount of said types of feed said animal actually consumes while at said trough during said predetermined period, said computer receiving information from said measuring means as to the actual consumption of each said animal from a said trough during said predetermined period and when an animal consumes less of any type of feed than data in a memory of said computer indicates such animal needs to meet its nutritional needs, said computer controls said delivery means to supply additional selected types of feed to said trough to be consumed by said animal which is substantially equal to or less than the amounts of types of food according to data in said memory which will meet the optimum nutritional needs of such animal.

33. An apparatus in accordance with claim 32, wherein said predetermined period comprises a predetermined period of time.

34. An apparatus in accordance with claim 32, which further comprises a milking compartment for confining said animal and robotic means associated with said milking compartment for automatically milking said animal confined therein, said trough being available whereby an animal in said milking compartment can consume feed therefrom.

* * * * *